(No Model.)
C. H. BAYLEY.
TRIMMING MECHANISM FOR SEWING MACHINES.
No. 272,519. Patented Feb. 20, 1883.
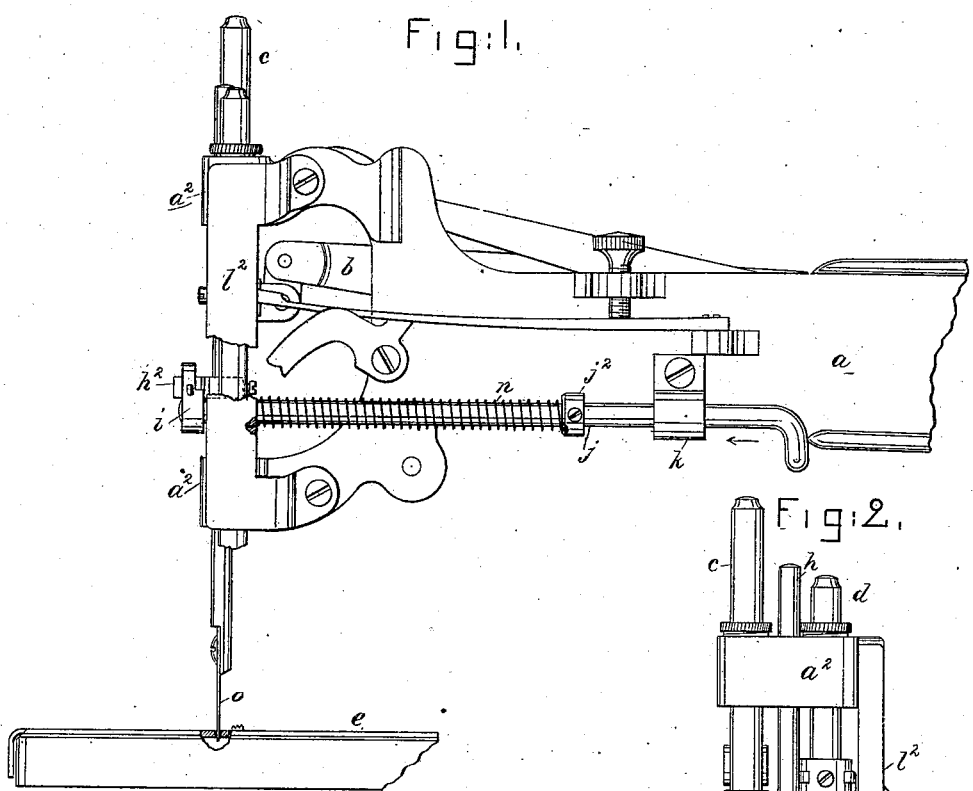
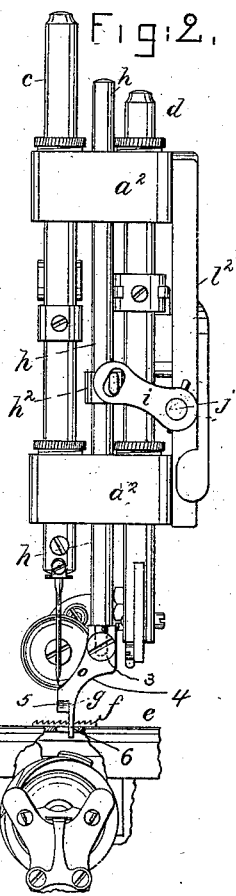
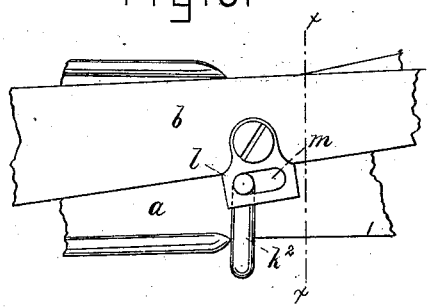
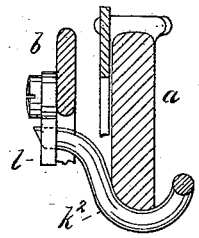
WITNESSES
N. E. C. Whitney
V. D. Dearborn
INVENTOR
Charles H. Bayley
by Crosby & Gregory
Attys

UNITED STATES PATENT OFFICE.

CHARLES H. BAYLEY, OF BOSTON, MASSACHUSETTS.

TRIMMING MECHANISM FOR SEWING-MACHINES.

SPECIFICATION forming part of Letters Patent No. 272,519, dated February 20, 1883.

Application filed July 24, 1880. (No model.)

*To all whom it may concern:*

Be it known that I, CHARLES H. BAYLEY, of Boston, county of Suffolk, State of Massachusetts, have invented an Improvement in Trimming Mechanism for Sewing-Machines, of which the following description, in connection with the accompanying drawings, is a specification.

This invention relates to trimming attachments for sewing-machines, to trim the material parallel with and close to the edge of the line of stitches being made by the needle.

In a trimming attachment heretofore patented to me, No. 212,122, I have shown a slotted slide-bar fitted to slide upon the outer part of the head of the machine. To trim closely to the line of stitches, this bar so located has to be bent, or else the body of the cutter has to be bent, to place the cutter in the proper relation to the needle. To avoid bending and slotting the bar or bending the cutter laterally, and make a stronger and more direct-acting trimming attachment, I have arranged a round cutter-bar in suitable holes in the head between the needle and presser bars, have provided it with an adjustable lug, and combined with it, to operate it, a rocking arm that derives its movement from the needle-bar-actuating arm; and I have devised to be attached to the lower end of the said cutter-bar a blade shaped as herein shown and described, whereby the material may be trimmed close to the line of stitching, whether straight, curved, or scalloped edges.

Figure 1 represents a sufficient part of a Wheeler & Wilson No. 6 machine to illustrate my invention; Fig. 2, a partial front end elevation thereof; Fig. 3, a detail of the parts at the rear of Fig. 1; and Fig. 4, a section on the dotted lines $xx$, Fig. 3.

In the said drawings, $a$ is the usual overhanging arm, $b$ the needle-bar-actuating arm or lever, $c$ the needle-bar, $d$ the presser-bar, $e$ the bed or cloth plate, and $f$ the feed, all as usual.

The blade $o$ is secured by means of a screw, 3, to the round cutter-rod $h$, fitted into holes made for it in the parts $a^2$ of the arm, and between and substantially in line with the presser and needle bars, the said rod $h$ being so located as to act with a direct straight thrust.

The knife or cutter is composed of a thin piece of steel having a slotted head to receive the screw 3, which confines the blade to the cutter-bar in an adjustable manner. Below its head the body of the blade is made to project forward, as a shoulder, 4, toward the needle-bar and the operator, and then is made to project downward, as shown in Fig. 2, the blade being provided with a beveled horizontal cutting-edge, 5, and a finger, 6, to enter and remain in the slot in the throat-plate.

The cutting-edge is in front of the finger, toward the operator, and the body of the blade at its rear side forms a prolongation, $g$, of the finger 6, so that a scallop may be readily turned up back of the finger and blade, to permit the cutting-edge to cut a sharp corner between the scallops. The cutting-edge 5 is made sharp by beveling it, as shown, on its outside, or its side farthest from the needle, and cuts the material close to the edge of the slot made in the usual throat-plate, through which the blade descends.

On the rod $h$ is adjustably secured a collar, $h^2$, having a forwardly-projecting stud, that is entered into a slot in the arm $i$, attached to the rock-shaft $j$, held in suitable bearings—one in ear $k$ and the other in bracket $l^2$. The rear end of this rod $h$ is extended across under the arm $a$ and into the eye $m$ of a slotted piece or stirrup, $l$, (see Figs. 3 and 4,) connected with the needle-actuating lever. This round and straight rod $h$ for the cutter is cheaper and more simple and durable than the slotted slide before referred to.

Upon the shaft $j$ is an adjustable collar, $j^2$, to hold the end of a spiral spring, $n$, the forward end of which bears against the head of the machine and holds the slotted arm, $i$, in engagement with the projection on the collar $h^2$ of the rod $h$. By moving the shaft $j$ in the direction of the arrow, Fig. 1, near it, and in opposition to the pressure of the spring, the arm $i$ may be disengaged from the collar $h^2$ to be elevated and turned aside out of operative position.

The finger 6 of the blade, it extending into and remaining in a slot in the throat-plate while the blade is in operation, prevents the cutting-edge 5 from being sprung out of position and striking the throat-plate when descending to cut the material, and it also, when cutting scallops, prevents the scallop last cut from being turned under the cutting-edge of blade 5.

I claim—

1. In combination, in a sewing-machine, the straight cutter rod or bar $h$, guided and reciprocated in the head of the machine between the needle and presser bars, the blade having the cutting-edge 5, finger 6, and body 4, inclined as described below its head, and connected with the said cutter-bar, and the needle-actuating arm, and means to reciprocate the rod and blade from the needle-actuating arm, substantially as described.

2. A trimming-knife for sewing-machines, composed of a blade having a horizontal cutting-edge, 5, a finger, 6, projecting downwardly from one edge of said cutting-edge, and a shoulder arranged at the side opposite the cutting-edge and above the latter, substantially as and for the purpose specified.

3. The trimming-knife comprising a blade having a sharpened horizontal cutting-edge, 5, provided with a finger, 6, a prolongation, $g$, of said finger, and the shoulder 4, arranged substantially as shown and described.

4. The combination, in a sewing-machine, of the needle and presser bars with a cutter-bar, appliances for reciprocating the same, and a knife having a horizontal cutting-edge, 5, and a finger, 6, at the rear of the cutting-edge, and connected to the cutter-bar, and extended laterally to a position adjacent to the needle, all substantially as shown, as and for the purpose set forth.

In testimony whereof I have signed my name to this specification in the presence of two subscribing witnesses.

CHARLES H. BAYLEY.

Witnesses:
G. W. GREGORY,
N. E. C. WHITNEY.